March 8, 1966     D. SHEFFET     3,239,802
SEISMIC GAIN CONTROL SYSTEM
Filed Oct. 16, 1962     3 Sheets-Sheet 1

INVENTOR:
David Sheffet
By Alan C. Rose
Attorney

March 8, 1966      D. SHEFFET      3,239,802

SEISMIC GAIN CONTROL SYSTEM

Filed Oct. 16, 1962      3 Sheets-Sheet 3

INVENTOR:
David Sheffet
By Alan C. Rose
Attorney

United States Patent Office 3,239,802
Patented Mar. 8, 1966

3,239,802
SEISMIC GAIN CONTROL SYSTEM
David Sheffet, Altadena, Calif., assignor to Western Geophysical Company of America, Los Angeles, Calif.
Filed Oct. 16, 1962, Ser. No. 230,809
2 Claims. (Cl. 340—15.5)

This invention relates to seismic recording systems including arrangements for programming the gain of the seismic signal amplifiers.

In the field of geophysical exploration, it is customary to set out an array or "spread" of seismic detector or pickup devices and then detonate an explosive charge or "short." Shock waves from the short travel down into the ground and are reflected from subsurface formations back to the surface where they are picked up by the detectors. Signals from the detectors are normally amplified and applied to a multichannel recorder. The seismic signals from the detectors are recorded on parallel tracks for subsequent interpretation and analysis. Geologists skilled in stratigraphy, the science which treats of the arrangement of geological strata, can provide much information regarding the nature of subsurface formations and the possible location of mineral or oil deposits by a thorough examination of the recorded information.

As the seismic signals are reflected from progressively deeper strata, the signals picked up at the detectors become progressively weaker. The nature of the reduction in amplitude varies from area to area according to the nature of the stratigraphic sequence which is under examination. The strength or amplitude of individual seismic reflections depends upon the elapsed time since the time of the shot, which is a parameter of depth, and upon the contrast in elastic constants between two adjacent strata. In order to increase the amplitude of the signals reflected from deeper strata, it has been customary to use amplifiers between the detector and the recorder which are provided with automatic gain control, or AGC. One representative system using AGC is disclosed in my patent application Serial No. 145,036, filed October 16, 1961, now Patent No. 3,188,575, and entitled "Geophysical Amplifier." While automatic gain control amplifiers yield useful seismic data in many cases, certain types of geological formations are not well suited for analysis by recording systems which include AGC. One type of stratigraphic sequence where seismic amplifiers provided only with simple AGC circuitry do not operate properly is one where the earth is relatively uniform with no major elastic discontinuities down to a moderate depth. At some particular depth, an abrupt change occurs in the elastic constants of a stratum, giving rise to an isolated high amplitude reflection. During the initial interval while the seismic shock wave is traversing the uniform region of the earth, no reflections are received at the detectors and the automatic gain control circuitry operates to maintain amplifier gain. When a strong reflection is received from a stratum immediately below the uniform region, the AGC circuit does not operate quickly enough to immediately control the strong reflection and very high-level signals are therefore applied to the recorder. These high-level signals overload the amplifiers and produce recorded signals which are difficult or impossible to interpret. Furthermore, as is well known in the art, owing to the time lag inherent in AGC operation, there is some delay in the recovery of amplifier gain immediately following the arrival of a strong reflection. Thus, a weak reflection closely following a strong reflection may be so suppressed as to be invisible on a seismic record.

Accordingly, an important object of the invention is to avoid the distortion and suppression of reflection signals which frequently occur in seismic amplifiers which are equipped with automatic gain control. A collateral object of the present invention is to provide a dual-mode seismic amplifier which can be operated either in a programmed mode or a normal AGC mode.

Another object of the invention is to provide a programmed gain control which will operate not only to gradually increase the amplifier gain in proportion to the average decay in reflection amplitude relative to elapsed time, but which can be programmed to reverse the gain versus time relationship for the purpose of suppressing a particular high amplitude reflection without over-suppressing a closely-following weak reflection.

It is yet another purpose of this invention to provide arrangements for measuring the absolute gain of the amplifiers at any point on a time-scale recording.

In accordance with one aspect of the present invention, seismic amplifiers may be controlled in a programmed manner so that their amplification varies inversely with the expected magnitude of the reflected signal. Normally, the amplification of the seismic amplifiers will be increased approximately exponentially with time to compensate for the normal exponential drop-off of reflected signal amplitude with increasing depth, and the programming circuitry permits a decrease of gain with time where necessary to secure proper recording in the presence of unusual stratigraphic sequences of the type noted above.

In a preferred embodiment of this invention, the seismic amplifiers are provided wtih a programmed gain operating mode and an AGC operating mode. When operating in the programmed gain mode, a high frequency oscillator provides the control voltage. A function generator varies the amplitude of the control voltage in accordance with any selectable function of time over an interval of, for example, three seconds to correspond with the usual seismic recording cycle. The output of the function generator is injected into a gain control circuit to vary the amplifier gain in real time in accordance with the desired function of time. In one specific implementation of the invention, the seismic amplifiers are each provided with a high frequency tuned circuit in the AGC circuitry, and the rectified high frequency control voltage is applied to the input of the seismic amplifiers together with the seismic signals. To avoid interference with the incoming low frequency seismic signals, the bias control voltage has a frequency well above the upper limit of seismic frequencies, which lie below 500 cycles. With this arrangement, the function generator associated with the high frequency control signal may be programmed to gradually reduce the amplitude of the gain control signal according to the known reflection characteristics of the geological area being surveyed, and for the particular geometric configuration of shot point and detector-spread location.

It is usually desirable to provide prebiasing for the amplifiers. The prebiasing signal sets the amplifiers to a desired low-gain initial state so that the first high-intensity waves from the detonation may be properly controlled. In accordance with my prior co-pending application cited above, this may be accomplished by applying a high frequency signal to the amplifiers up to the time that a seismic recording cycle is initiated. If operating in the AGC mode, after the cycle is started, the high frequency prebiasing signal is disconnected and allowed to leak off according to the resistance-capacitance constants of the AGC circuit, and the seismic signals thereafter are employed to control the amplifier gain. When operating in the Programmed Gain Control or PGC mode, the prebias signal becomes the control signal, and its magnitude, after initiation of the recording cycle, is varied according to the settings of the function generator and independently of the incoming seismic signals.

In accordance with a feature of the invention, therefore, a dual-mode seismic amplifier is provided in which a high frequency control signal is employed for prebiasing in the AGC mode, and the control signal is also employed for the programmed control of gain in the programmed mode of operation in the amplifier. To implement the shift between the two modes of operation of the seismic amplifier, switching circuitry is provided in each AGC circuit for selectively eliminating low frequency seismic signals from the AGC circuitry.

In accordance with another feature of the invention, the function generator for cycling the magnitude of the high frequency control voltage, may be provided with a series of adjustments each having linear adjustment ranges which provide equal increments of attenuation in decibels when the control signal is applied to the seismic amplifier. The function generator includes a nonlinear arrangement supplying different increments of voltage to the successive linear steps in the adjusting mechanism to compensate for the nonlinear response characteristic of the automatic gain control circuit of the seismic amplifiers.

In one specific embodiment, a transformer is provided with output taps spaced nonlinearly along its output winding. Conductive bus strips are connected to each output tap, and adjustments for output leads for each portion of the recording time cycle are employed to connect the particular output lead with one of the bus strips. During the recording cycle, the function generator operates to apply a control voltage over successive ones of the output leads to all of the seismic amplifiers. The gain of the seismic amplifiers during the entire recording cycle may therefore be programmed by presetting the successive function generator adjustments, which are directly calibrated in decibels.

Other objects, features and advantages of the invention may be readily apparent from a consideration of the following detailed description and from the drawings, in which.

Figure 1:
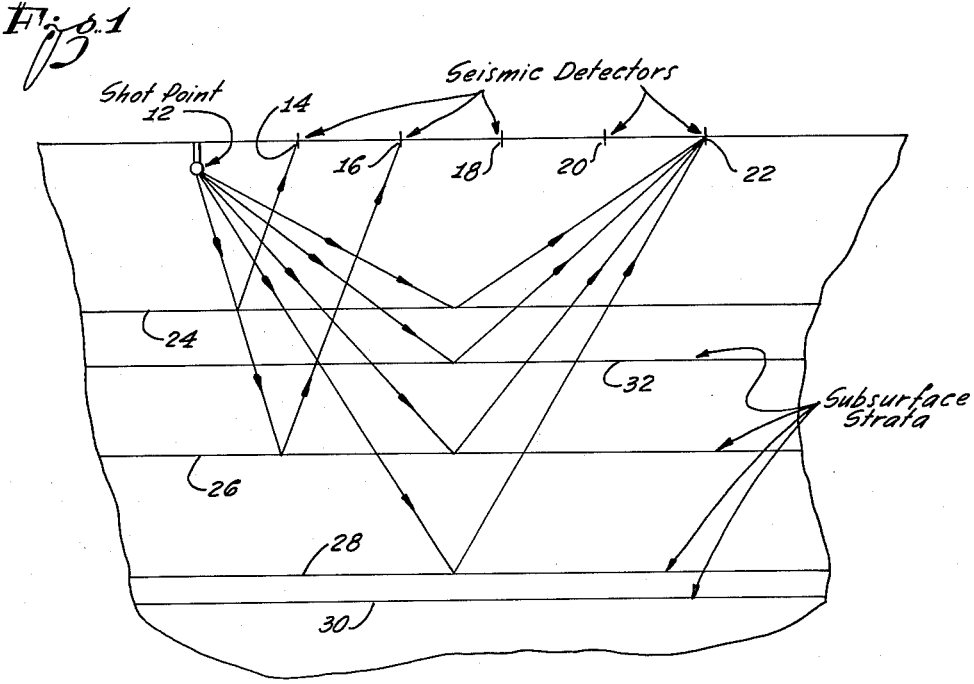
FIG. 1 is a diagrammatic showing of a typical seismic shot point and detector arrangement.

Referring more particularly to the drawings, FIG. 1 shows, schematically, a typical arrangement of a shot point 12 and a series of seismic detectors 14, 16, 18, 20 and 22. A set of seismic detectors is normally termed a "spread" in the geophysical exploration art. Twenty-four detectors or sets of detectors are characteristically included in a spread, and the multichannel recorders employed in geophysical work normally include at least twenty-four channels to accommodate signals from the various detection points. In FIG. 1, the shot point is shown at one end of the spread of detectors. However, other arrangements are frequently employed; one other widely-used spread involves location of the shot point on the perpendicular bisector of a linear spread and offset from the spread by a few hundred feet.

A recording cycle is normally initiated at the time a shot is detonated at shot point 12. The shock wave travels down into the earth to be reflected off the various subsurface formations 24, 26, 28, 30, and 32, for example. The shock wave also travels horizontally just beneath the surface of the earth and is picked up at high amplitude levels at the detectors 14 through 22. The surface shock wave creates a signal known as the "first break" signal, and this first break signal is commonly employed to initiate the recording cycle.

As mentioned above, the first break signals are of relatively high intensity. As the signals are reflected from progressively deeper strata, they normally become weaker. The intensity of reflections depends both on the depth of the subsurface strata and the resultant distance which must be traversed by the shock wave, and also upon the difference of acoustic properties of geological formations on either side of the interfaces 24, 26 and 28. The reflections of highest amplitude occur when there are large abrupt differences in the acoustic properties of the adjacent materials on the two sides of the reflection surfaces 24, 26, 28, 30 and 32, for example, of FIG 1.

Figure 2:
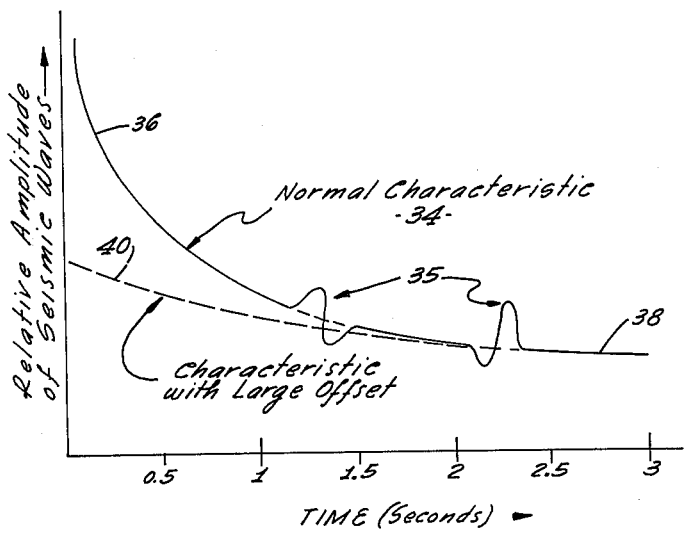
FIG. 2 is a plot of the amplitude of seismic waves against time following the detonation of a shot.

FIG. 2 is a typical characteristic showing the average relative amplitude of seismic waves plotted against time. This characteristic also corresponds roughly to a plot of reflection amplitude versus depth of strata from which the reflections are received.

In FIG. 2 the normal characteristic 34 is shown for the usual geological structures and the normal spacing or offset of the shot point from the seismic detectors. In general, the upper portion 36 of characteristic 34 is somewhat steeper than a normal exponential curve, and the lower portion 38 is somewhat more shallow in its slope than an exponential curve. The dashed line characteristic 40 is relatively lower and less steep at small values of time than the characteristic 34. This is attributed to the large offsets for which the characteristic 40 is plotted. With large offsets of the shot point from the detectors, the initial signals never reach the high amplitude levels indicated by the upper portion 36 of the normal characteristic 34. The characteristics 34 and 40 represent the *average* decay rate of seismic energy as a function of seismic travel time. Frequently, isolated reflections occur whose amplitude is significantly different from the average. The effect is to produce short-term reversals 35 in the "normal" characteristics 34 or 40.

Figure 3:
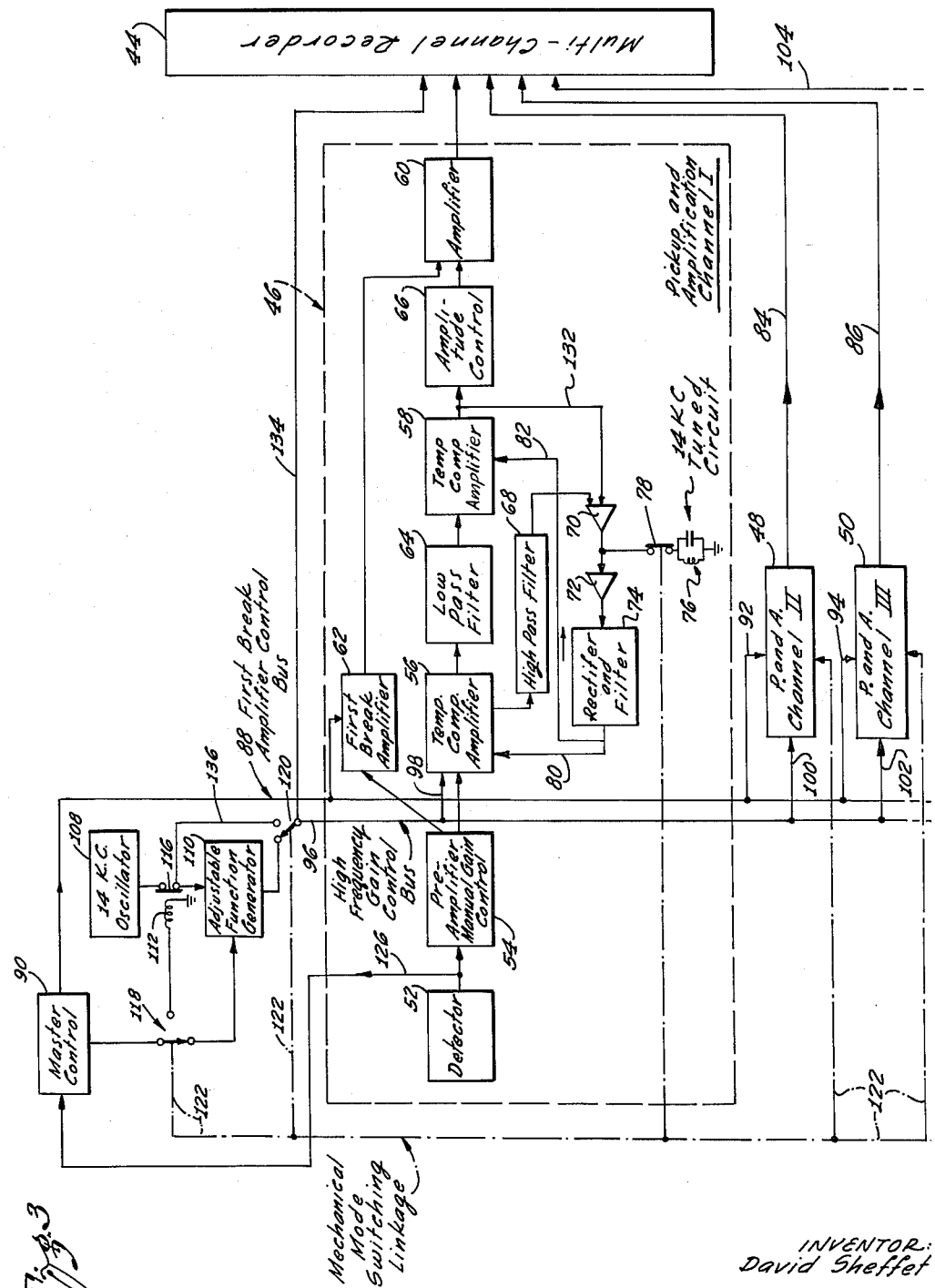
FIG. 3 is a block diagram of the dual-mode seismic recording system of the present invention.

FIG. 3 is a block diagram of the circuitry employed for implementing the dual-mode automatic gain control circuits of the present invention. In FIG. 3 the multichannel recorder 44 receives signals from a series of pickup and amplification channels 46, 48 and 50. The circuitry of channel I is shown in the dashed line box 46. Channels II and III include the same circuitry as shown in block 46 but are shown as solid line blocks 48, 50, for ease of illustration. The circuitry within the block 46 is, for the most part, shown in my prior copending patent application cited above. By way of a brief description, however, the circuit includes the seismic detector 52, the preamplifier and manual gain control circuit 54, and several additional stages of amplification 56, 58 and 60. Channel I also includes a "first break" amplifier 62 which is connected between the preamplifier 54 and the final amplification stage 60. The initial signals which are applied to the first break amplifier are of relatively high frequencies and therefore do not pass through the main amplification channel. As discussed below, the shunt path through the first break amplifier 62 is disabled early in the recording cycle immediately after the first break signals have been received.

The main amplification path also includes the low or signal frequency filter 64 and the amplitude control circuit 66. Circuit 66 includes manually adjustable amplitude controls for adjusting the signal level to match the required input level of the recorder 44. The automatic gain control circuitry includes the high frequency filter 68, the AGC amplification stages 70 and 72, the rectifier and filter circuit 74 and a tuned circuit 76. The tuned circuit 76 may be selectively coupled to the automatic gain control circuit. When the switch 78 is closed, the tuned circuit 76 presents a high impedance to 14 kilocycle signals but shunts all other signals applied to the AGC circuit to ground. When switch 78 is closed, therefore, seismic signals are not coupled to the automatic gain control circuit. The leads 80 and 82 couple feedback signals to the amplifiers 56 and 58.

The additional seismic pick-up and amplification channels II and III, represented by blocks 48 and 50, each include a set of the circuits which appear in the dashed line block 46 and which were discussed above. Ampified output signals from channels II and III are applied on leads 84 and 86, respectively, to the multichannel recorder 44. The first break amplifier control bus 88 is connected to the first break amplifier 62 and disables it at the appropriate moment when signals are applied from the master control unit 90. Leads 92 and 94 are provided to connect the bus 88 to the first break amplifiers included in channels II and III, respectively.

As discussed in greater detail below, a high frequency signal for prebiasing the AGC circuits and for controlling the amplifier gain is provided on bus 96. Leads 98, 100 and 102 connect the gain control signal from bus 96 to channels I, II and III, respectively.

Additional pick-up and amplification channels up to channel XXIV are normally provided, and all of these channels are connected to receive signals from both buses 88 and 96. The additional channels interconnect the remaining detectors of a twenty-four detector spread to the recorder 44 by leads such as lead 104.

To understand the operation of the present dual-mode seismic recording system, it is necessary to consider the function of some of the common control circuits. These common control circuits include the high frequency oscillator circuit 108, the adjustable function generator circuit 110, relay 112, and a number of switches. The switches include switch 116, which cuts off the prebias signal after the first break signals arrive when seismic signals are employed for automatic gain control; and switches 118 and 120, which are controlled by the mechanical linkage 122 in common with switch 78 to change the mode of operation of the seismic apparatus.

A single recording cycle normally lasts approximately three seconds. The first break signal from one of the detectors, such as detector 52, is normally employed to initiate the recording cycle. In the present case, the output of detector 52 is transmitted through lead 126 to energize the master control circuit 90 and initiate the recording cycle.

The two different modes of operation of the seismic recording system will now be considered. From a functional standpoint, the gain of the system may be controlled either (1) automatically as a function of incoming seismic signal strength by means of the AGC circuitry or (2) on a programmed gain control basis in real time under the control of a preset function generation circuit. A prebiasing arrangement may be provided for both modes. Switching between the two modes of operation is accomplished by means of the mechanical linkage indicated by dashed lines 122. When the switches 118, 120, 78 and corresponding switches associated with channels II, III, etc. are in the positions shown in FIG. 3, the programmed gain mode is operative. When the switches 118, 120 and 78 are in the other positions, under control of mechanical linkages 122, the first mode involving automatic gain control by seismic signals, is in operation.

Consideration will first be given to the programmed gain control mode as indicated by the positions of the switches shown in FIG. 3. In this mode a shot is detonated and the first break signal picked up by detector 52 is transmitted along lead 126 to initiate the recording cycle. At this time the output from the 14 kilocycle oscillator 108, which provides the gain control signal, is applied through function generator 110 and switch 120 to amplifier 56 in channel I and to the comparable amplifier stages in the other channels. These high frequency signals from oscillator 108 are transmitted through amplifier 56, high frequency filter 68, amplifiers 70 and 72, to the rectification and filter circuit 74. The resultant bias control voltage on leads 80 and 82 are applied to amplifier stages 56 and 58. With switch 78 closed, the low frequency seismic signals which are applied on lead 132 to AGC amplifier 70 are short-circuited to ground through the filter circuit 76, thus disabling the automatic gain control mode. As noted above, however, filter circuit 76 presents a high impedance to the 14 kilocycle gain control signals which originate at oscillator 108. The gain is therefore wholly under control of the level of signals applied from oscillator 108 through function generator 110 to the amplifiers.

The function generator 110 (shown in detail in FIG. 5) is set into operation by the master control circuit 90 immediately upon receipt of the first break signal on lead 126. Circuit 110 provides an output signal variable with time when a constant amplitude input signal is applied to it. The function generator 110 may include a variable transformer, and is preferably of the type shown in L. B. Scott et al., Patent 3,032,702, granted May 1, 1962. The circuit of the Scott patent includes a rotatable shaft intended for continuous rotation, and a series of adjustable taps for providing any desired output voltage as the shaft is rotated through its cycle of operation. Function generator 110 includes the variable transformer of the patent cited above and a motor with an associated gearbox for changing the taps on the transformer to provide the desired varying output voltage during the recording cycle. The cycle of the function generator 110 is, of course, commensurate with that of the recorder 44, and will normally extend for a time period of about three seconds for most seismic work. The function generator 110 can be set to follow any of the characteristics 34, 35, 40 as set forth in FIG. 2 of the present drawings. Other known or empirically determined gain versus time characteristics including reversal of gain, may be set into the function generator 110 to correspond with the amplitude function associated with any specific spread geometry or with any specific elastic characteristics of the area under survey.

When the seismic recording system is operating in the mode wherein the gain is solely under the control of function generator 110, the received signals will always be in the proper relative magnitude. Thus, for example, even where the stratigraphic sequence includes an extended uniform zone producing no reflections, the gain of the amplifiers may be gradually and systematically changed so that a sudden large reflection does not overload the amplifiers and produce distorted output signals in the recorder.

In accordance with another important feature of the program controlled gain mode of operation, a lead 134 is provided from the output of function generator 110 to the recorder 44. Arrangements are provided to record this signal on a separate trace of the multichannel recorder 44 and indicates the relative magnitude of the gain control signal throughout the recording cycle. This extra trace is particularly useful in the subsequent analysis of the seismic data recorded on the other traces of the multichannel recorder. Thus, from an examination of the amplitude of the gain control signal, the absolute magnitude of any received seismic signal on the other recording channels may be determined. This is in contrast with the situation in which seismic signal automatic gain control is employed and the amplification level of the individual amplifiers at each instant is essentially indeterminate, as it is a function of the previous seismic signals and the time constant of the AGC circuit.

To achieve the other mode of operation in which seismic signal automatic gain control is employed, the mechanical linkages 122 are actuated to move switches 118, 120 and 78 to their alternate positions. In the case of switch 78 and the other filter circuits in channels II, III and following, the switches, such as switch 78, are opened, thus preventing short-circuiting of seismic signals and hence reactivating the seismic AGC feature. Prior to the detonation of the shot, the 14 kilocycle oscillator applies signals through switches 116 along lead 136 through switch 120 to bus 96 and the amplifier channels. This signal has the effect of prebiasing the amplifiers to the desired initial attenuation level. When the recording cycle is initiated by the transmission of a first break signal along lead 126 to the master control 90, a triggering signal is transmitted through switch 118 to energize relay 112 and open switch 116. This removes the high frequency prebiasing signal from the amplifier channels which now decays, according to the RC time constants, and low frequency seismic signals are transmitted along lead 132 to the automatic gain control amplifiers 70 and 72. As switch 78 is now open, these low frequency signals are not short-circuited to ground but are supplied to the rectification and filter circuit 74 to provide the desired automatic gain control.

Figure 4:
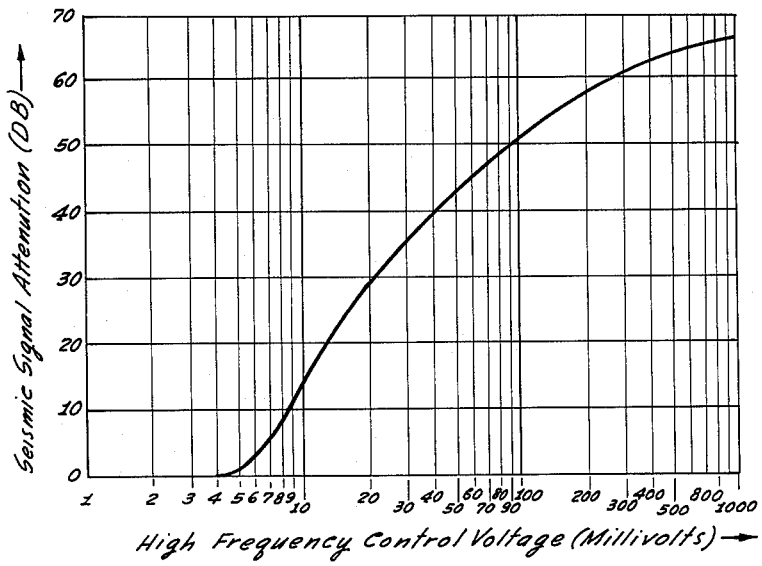
FIG. 4 is a plot of seismic signal attenuation versus high frequency control voltage for the system of FIG. 3.

The nature of the seismic amplifiers and the compatibility of the seismic amplifiers and the function generator 110 of FIG. 3 will now be considered in somewhat greater detail. Initially, the plot of FIG. 4 shows the attenuation for seismic signals in decibels plotted against the magnitude of the high frequency control voltage, indicated in millivolts. The nonlinear nature of the signal is worthy of note. At low levels of control voltage in the range of 10 millivolts, a small change in voltage produces a significant reduction in gain. As the control voltage magnitude increases, however, a larger change in voltage is required to produce the same change in gain.

Figure 5:
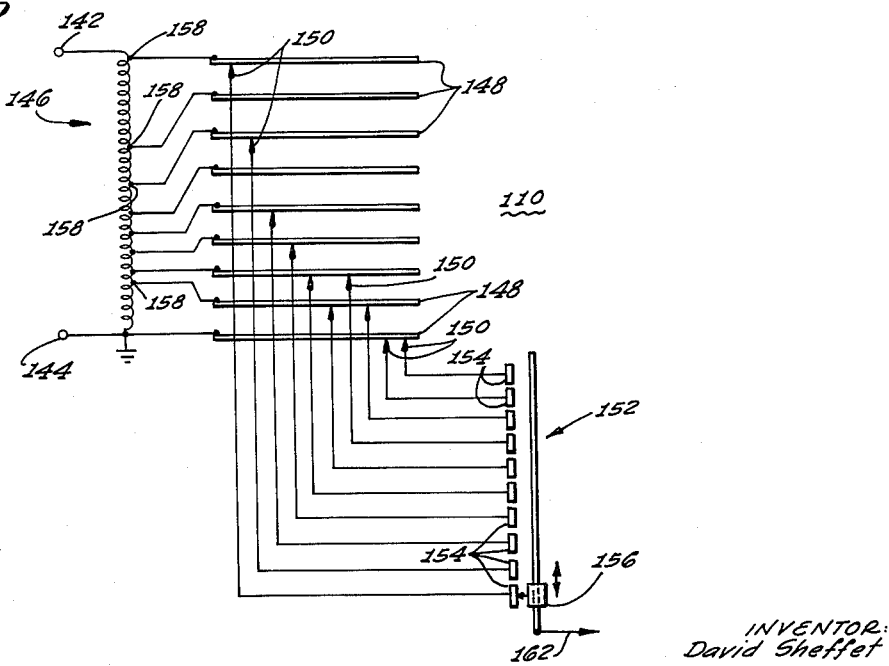
FIG. 5 is a circuit diagram indicating, schematically, the mode of operation of the function generator of FIG. 3.

The design of the function generator circuit of FIG. 5 is significantly dependent upon the characteristic of the seismic amplifiers as shown in FIG. 4, as will be discussed in detail below. In generally, with reference to the circuit of FIG. 5, in includes input terminals 142 and 144 to which the 14 kilocycle oscillator 108 is connected, an autotransformer 146, and a series of bus strips 148 connected to successive tap points on the autotransformer 146. The circuit also includes a series of adjustable contacts 150, and an output commutating switch 152. While only a few bus strips 148 and contacts 150 are shown in FIG. 5, many more are normally employed in practice. In one operative function generator, 30 of each were used. The output switch 152 has a number of fixed contacts 154 and a movable contact member 156 for successively contacting the fixed contact elements 154. Suitable techniques for avoiding discontinuities in the output signal from switch 152 are well known in the art and are disclosed, for example, in Patent No. 3,032,702 cited above. The adjustable contacts 150 are useful in providing a desired characteristic such as that shown in FIG. 2. As the switch contact 156 is driven across the fixed contacts 154, attenuation is introduced into the seismic amplifiers in accordance with the positions of contacts 150.

In accordance with one aspect of the present invention, the taps 158 on the transformer 146 are spaced to provide equal increments of attenuation in the seismic amplifier by adjustments of contacts 150 between successive bus strips 148. To secure this result, the spacings between the taps 158 are arranged to correspond with successive control voltage points providing successive increments of attenuation in the characteristic of FIG. 4. By way of specific example, for a 15-tap transformer it would be desirable for each of the bus strips 148 to provide a successive increment of 5 decibels of attenuation in the seismic amplifiers. With a 1000-turn transformer the tap points on the transformer may be read off in turns on the control voltage scale corresponding to successive 5 decibel points along the ordinate axis of FIG. 4. Thus, for example, the first tap point is at zero turns, the second tap point (corresponding to 5 decibels attenuation) is at about 7 turns and the third tap point would be located at approximately 9 turns. The successive additional tap points across the 1000-turn transformer would be at 11, 13, 17, 22, 29, 42, 60, 90, 140, 250 and 500 turns, and at the top of the 1000-turn transformer. In each case these turn values are determined by reading across from successive 5 decibel attenuation points and then reading down onto the control voltage scale in FIG. 4. For transformers having other numbers of turns, a suitable proportion would naturally be established to determine the proper number of turns. Similarly, with other AGC characteristics, slight variations in the characteristic of FIG. 4 and the corresponding nonlinearity of the tap spacing would be accomplished.

In practice, a suitable attenuation function similar to those shown in FIG. 2 is established by contacts 150. These contacts 150 may be adjusted in accordance with a linear adjustment from bus strip to bus strip calibrated in decibels of attenuation for the seismic amplifier. As the seismic recording cycle progresses, the contact 156 moves upwardly, and the proper output control voltage appears on lead 162. When this voltage is applied to the seismic amplifiers, they are adjusted to the level of attenuation selected by movable contacts 150. Note that the tap arrangement may be set to produce a reversal in gain corresponding that indicated at 35 in FIG. 2.

In many areas, the automatic gain control mode gives good results and is useful. In other areas, the programmed gain control is to be preferred. In addition, certain scientific techniques employed by particular geophysicists in their analyses require an exact indication of the relative magnitude of reflected signals. For these analyses, programmed gain control is necessary.

The system of FIG. 3 is particularly advantageous in the implementation of both of the two modes of gain control described above. Thus, a single high frequency signal source is employed both for prebiasing, and also for providing programmed control voltage signal. In addition, the circuit layout of each channel is adapted for operation in either mode, with the exception of the minimal change of inserting or deleting one simple and inexpensive tuned circuit in each channel in switching from one mode to the other.

It is to be understood that the above-described arrangements are illustrative of the principles of the invention. Numerous other arrangements may be devised by those skilled in the art without departing from the spirit and scope of the invention. Thus, by way of example and not of limitation, other circuitry may be employed to block the seismic signals from th eautomatic gain control circuit; similarly, other conventional circuits may be employed to implement the functions described hereinabove. Accordingly, from the foregoing remarks, it is understood that the present invention is to be limited only by the spirit and scope of the appended claims.

I claim:

1. In combination, in a geophysical recording system:
   an amplifier;
   a programmable gain control circuit having an input, and an output connected to control the gain of said amplifier;
   a function generator having a control voltage output which is an arbitrary function of time;
   means for applying said output of said function generator to said input of said gain control circuit to thereby vary the gain of said amplifier;
   said amplifier having a predetermined nonlinear attenuation versus control voltage characteristic; and
   compensatory adjustment means included in said function generator for providing a linear decibel attenuation scale at the output of said amplifier which are separately adjustable for each of a series of successive time intervals.

2. In a seismic recorder for recording a cycle of reflected shock waves:
   a recorder;
   a seismic detector;
   an amplifier including associated AGC circuitry interconnecting said detector and said recorder;
   means for applying high frequency control voltages to said amplifier in a frequency band above the seismic frequency band, said amplifier having a predetermined attenuation versus control voltage characteristic;

means for applying both seismic signals and high frequency signals transmitted through the amplifier together to said AGC circuitry;

means for blocking the seismic signals from said AGC circuitry;

a function generator for varying the amplitude of said control signals substantially in accordance with the normal amplitude decay characteristics of seismic signals with time, said function generator including a series of adjustments for controlling attenuation during successive time intervals of the recording cycle, said adjustments being linearly calibrated for equal increments of attenuation of said amplifiers in accordance with said predetermined characteristic; and a master control circuit for initiating the recording cycle and starting the cyclic operations of said function generator.

References Cited by the Examiner

UNITED STATES PATENTS

| | | | |
|---|---|---|---|
| 2,286,170 | 6/1942 | Heiland | 340—15.5 |
| 2,424,705 | 7/1947 | Parr | 340—15.5 |
| 2,723,387 | 11/1955 | Slavin | 340—15.5 |
| 2,838,742 | 6/1958 | McManis | 340—15.5 |
| 2,982,919 | 5/1961 | Montgomery | 340—15.5 X |
| 3,048,817 | 8/1962 | Greening | 340—15.5 |
| 3,083,341 | 3/1963 | White et al. | 340—15.5 |
| 3,147,459 | 9/1964 | McCarter | 340—15.5 |

BENJAMIN A. BORCHELT, *Primary Examiner.*

CHESTER L. JUSTUS, *Examiner.*